(12) United States Patent
Yamaguchi et al.

(10) Patent No.: US 9,573,089 B2
(45) Date of Patent: Feb. 21, 2017

(54) FILTER FRAME

(71) Applicant: CANON KABUSHIKI KAISHA, Tokyo (JP)

(72) Inventors: Yoshimasu Yamaguchi, Kawasaki (JP); Takashi Uno, Noda (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/325,737

(22) Filed: Jul. 8, 2014

(65) Prior Publication Data
US 2015/0013287 A1 Jan. 15, 2015

(30) Foreign Application Priority Data
Jul. 11, 2013 (JP) .................................. 2013-145672

(51) Int. Cl.
*B01D 46/52* (2006.01)
*B01D 46/00* (2006.01)

(52) U.S. Cl.
CPC ......... *B01D 46/521* (2013.01); *B01D 46/0002* (2013.01); *B01D 46/0005* (2013.01); *B01D 46/523* (2013.01); *B01D 2265/028* (2013.01)

(58) Field of Classification Search
CPC ... B01D 46/0002; B01D 46/10; B01D 46/521; B01D 46/522; B01D 46/523; B01D 46/0005; B01D 2265/028
See application file for complete search history.

(56) References Cited

U.S. PATENT DOCUMENTS

| | | | |
|---|---|---|---|
| 4,617,122 A | 10/1986 | Kruse et al. | |
| 5,531,892 A | 7/1996 | Duffy | |
| 5,618,324 A * | 4/1997 | Sommer | B01D 46/0001 55/497 |
| 7,169,202 B2 | 1/2007 | Kubokawa | |
| 2003/0070406 A1 * | 4/2003 | Duffy | B01D 29/031 55/497 |

(Continued)

FOREIGN PATENT DOCUMENTS

| | | |
|---|---|---|
| CN | 1898007 A | 1/2007 |
| CN | 101743049 A | 6/2010 |

(Continued)

OTHER PUBLICATIONS

Office Action issued in Chinese Patent Application No. 201410328465.X, dated Jan. 26, 2016.

(Continued)

*Primary Examiner* — Robert Clemente
(74) *Attorney, Agent, or Firm* — Fitzpatrick, Cella, Harper & Scinto

(57) ABSTRACT

A filter frame for holding a filter provided with a plurality of folds so as to alternately form ridges and troughs includes: a first frame portion including a first holding portion, having a side corresponding to a first side of the filter, for holding the filter; a positioning portion, provided on the first holding portion, for determining a position of the filter; and a second frame portion including a second holding portion for holding the filter by sandwiching the filter between the first and second holding portions. The second holding portion is provided so as to be capable of opposing the first holding portion via the filter and has a side corresponding to a second side of the filter.

9 Claims, 12 Drawing Sheets

(56) References Cited

U.S. PATENT DOCUMENTS

2005/0138905 A1* 6/2005 Kubokawa ......... B01D 46/0016
  55/497
2010/0166451 A1 7/2010 Von Schischka et al.

FOREIGN PATENT DOCUMENTS

| JP | 11-511380 A | 10/1999 |
| JP | 2000-343936 A | 12/2000 |
| JP | 2011-194364 | 10/2011 |

OTHER PUBLICATIONS

Office Action issued in Chinese Patent Application No. 201410328465.X dated Nov. 22, 2016.

* cited by examiner

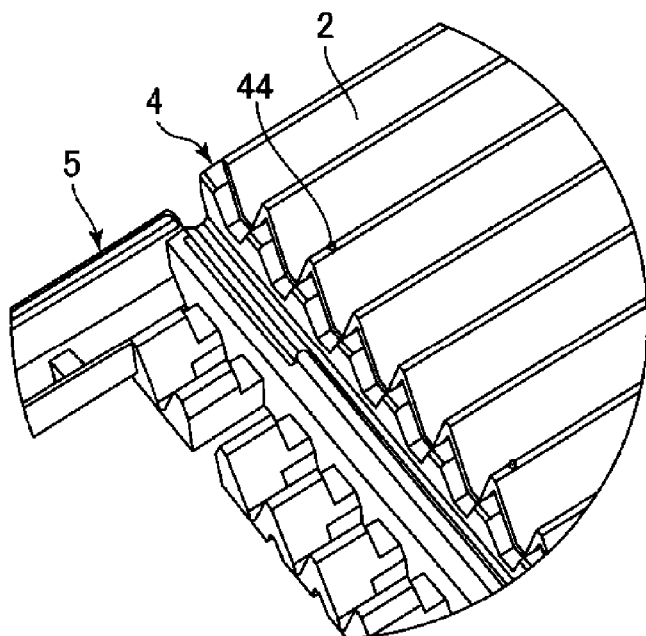
(a)
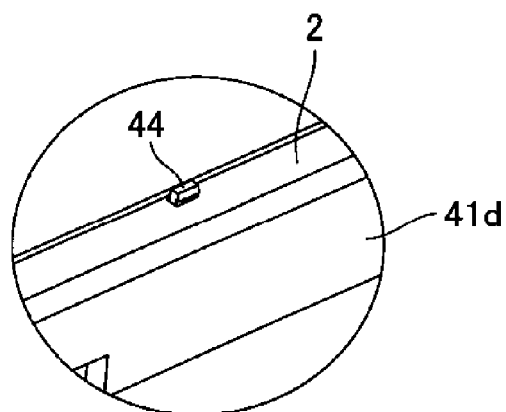
(b)
Fig. 9

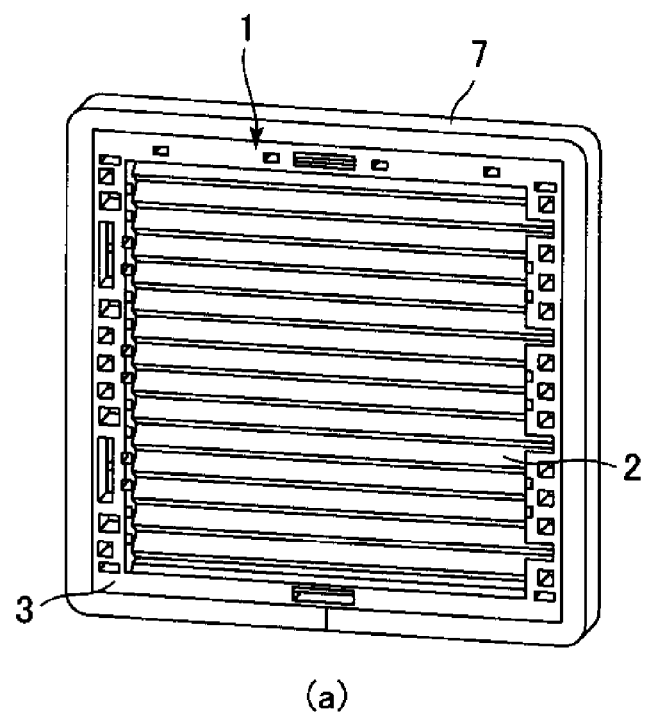
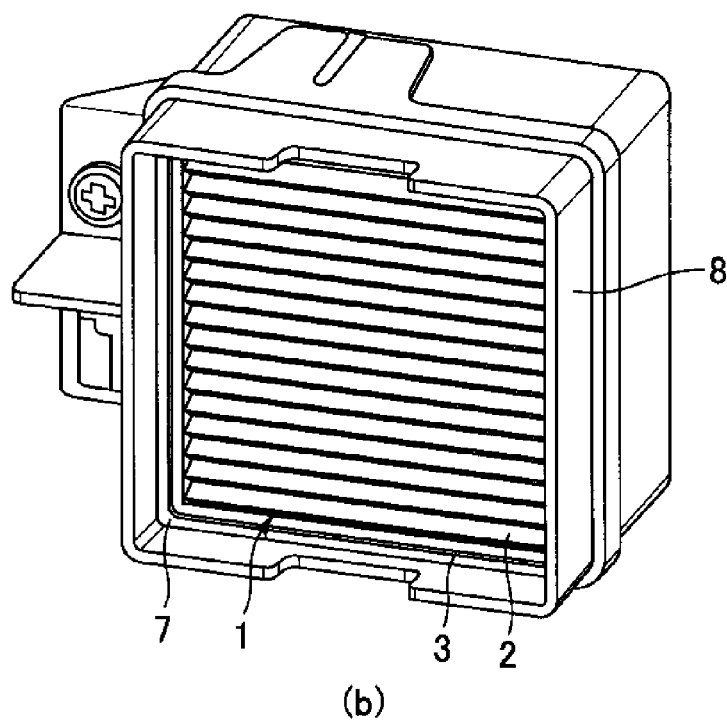
Fig. 12

FILTER FRAME

FIELD OF THE INVENTION AND RELATED ART

The present invention relates to a filter frame for use with a dust collecting filter or the like provided in an exhaust duct in an image forming apparatus.

For example, in a main assembly of the image forming apparatus, such as a copying machine or a printer, of an electrophotographic type, a plurality of electrical parts (components) such as a motor, a fan and a power source substrate are mounted. These parts are disposed inside the apparatus main assembly as driving sources and the like for various constituent elements for performing a process starting from sheet feeding to discharge of an image-formed product via image formation. Such electrical parts generate heat from a main body thereof, and when the heat is accumulated in the main assembly of the image forming apparatus, a temperature in the apparatus main assembly increases. When the temperature in the main assembly of the image forming apparatus excessively increases, e.g., a member such as a plastic-made paper feeding guide mounted in the apparatus main assembly is thermally deformed, thus causing paper jamming of feeding paper in some cases.

Further, depending on an environment of a disposition place of the image forming apparatus, such a phenomenon that dirt and dust are accumulated in the apparatus main assembly or are raised and floated by vibration due to an operation of the image forming apparatus or air blowing by a fan or the like occurs. When the dirt and the dust are excessively accumulated or floated, e.g., the dirt and the dust are deposited on a surface of the sheet to cause lack of a part of an image when the image is transferred onto the sheet is some cases.

Therefore, in general, the image forming apparatus is provided with a fan and a duct for the purpose of cleaning and exhausting the air in the apparatus main assembly, and is provided with a dust collecting filter, in a path of the duct, as a constituent element (dust collecting constituent element) for collecting the dust.

In order to ensure higher exhausting efficiency and high dust collecting efficiency of an exhaust duct, periodical maintenance of the dust collecting filter, i.e., periodical exchanging (replacing) operation of the dust collecting filter is required. Further, in the case where a frequency of exchanging of the dust collecting filter contaminated by the duct collection is increased or in the like case, it is important to improve operativity (workability) such as provision and exchange or the like of the dust collecting filter.

As the dust collecting filter, a filter subjected to pleating, a wide air transmission area is ensured by a folded filter having an area larger than an operation area (flow path cross sectional area), so that filter characteristics (such as an air pressure loss reducing characteristic, a collecting efficiency improving characteristic, a durability improving characteristic and the like) can be sufficiently achieved.

It is in general difficult to sufficiently achieve the characteristics of the pleated filter while maintaining a shape of the pleated filter alone, and therefore the pleated filter is used in a state in which the pleated filter is held by a holding means such as a reinforcing member for holding the pleated filter.

The filter contaminated by collecting the dirt and the dust is demounted from the holding means and then is replaced with a fresh (new) filter. At this time, if demounting and mounting of the filter are simple, the filter exchanging operation during the maintenance is simplified, so that a large advantage can be obtained.

Japanese Laid-Open Patent Application (JP-A) Tokuhyo Hei 11-511380 discloses a filter assembly in which a plurality of triangular pleating stabilization elements are provided inside side walls of a filter frame. This filter assembly has a constitution in which pleated ridges of a pleated filter are held in a ridge holding gap between adjacent pleating stabilization elements is employed.

Further, JP-A 2000-343936 discloses a filter structure having a constitution in which a pleated filter as a dust collecting filter is superposedly provided together with a frame assembled with a deodorant filter and a dust collecting member and together with the another dust collecting member or the like.

However, in the filter assembly in JP-A (Tokuhyo) Hei 11-511380, the filter is held in the filter frame only by friction engagement by inserting the pleated ridges into the pleated ridge holding gap. For that reason, in the case where a user or a service person presses or touches the filter with fingers or hands during a disposition operation or the like of the filter assembly, there is a possibility that a dust collecting function of the filter is lowered by disconnection or deviation of the filter from the filter frame.

In the structure of JP-A 2000-343936, due to variation in size of the filter, a position of the filter relative to the frame is not readily determined. That is, when a degree of fold of the filter by the pleating is strong, in some cases, an angle between adjacent ridge and trough becomes acute, and thus a dimension of the filter with respect to a direction substantially perpendicular to folds is decreased. On the other hand, when the degree of fold of the filter by the pleating is weak, in some cases, the angle between adjacent ridge and trough becomes obtuse, and thus the dimension of the filter with respect to the direction substantially perpendicular to the folds is increased. As a result, in some cases, the filter cannot be disposed at a nominal (predetermined) position by partial protrusion of the filter from the frame, partial superposition of the filter on the frame or deformation of the filter by the deodorant filter, the dust collecting filter or another dust collecting filter. For this reason, there is a possibility that the dust collecting function of the filter is lowered, and at the same time, operativity during the exchange of the filter becomes poor.

SUMMARY OF THE INVENTION

A principal object of the present invention is to provide a filter frame capable of not only holding a pleated filter at a predetermined position thereof with reliability but also improving operativity during installation, exchange and the like of the filter.

According to an aspect of the present invention, there is provided a filter frame for holding a filter provided with a plurality of folds so as to alternately form ridges and troughs, the filter frame comprising: a first frame portion including a first holding portion, having a side corresponding to a first side of the filter, for holding the filter; a positioning portion, provided on the first holding portion, for determining a position of the filter; and a second frame portion including a second holding portion for holding the filter by sandwiching the filter between the first and second holding portions, wherein the second holding portion is provided so as to be capable of opposing the first holding portion via the filter and has a side corresponding to a second side of the filter.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

In FIG. 9, (a) and (b) are enlarged views of portions E and G, respectively, of the filter assembly shown in FIG. 8.

In FIG. 12, (a) and (b) are perspective views of the filter assembly for illustrating the mounting procedure of the filter assembly into the image forming apparatus in the Embodiment and for illustrating the exchanging procedure of the filter assembly in the Embodiment.

DESCRIPTION OF THE EMBODIMENTS

Figure 1:
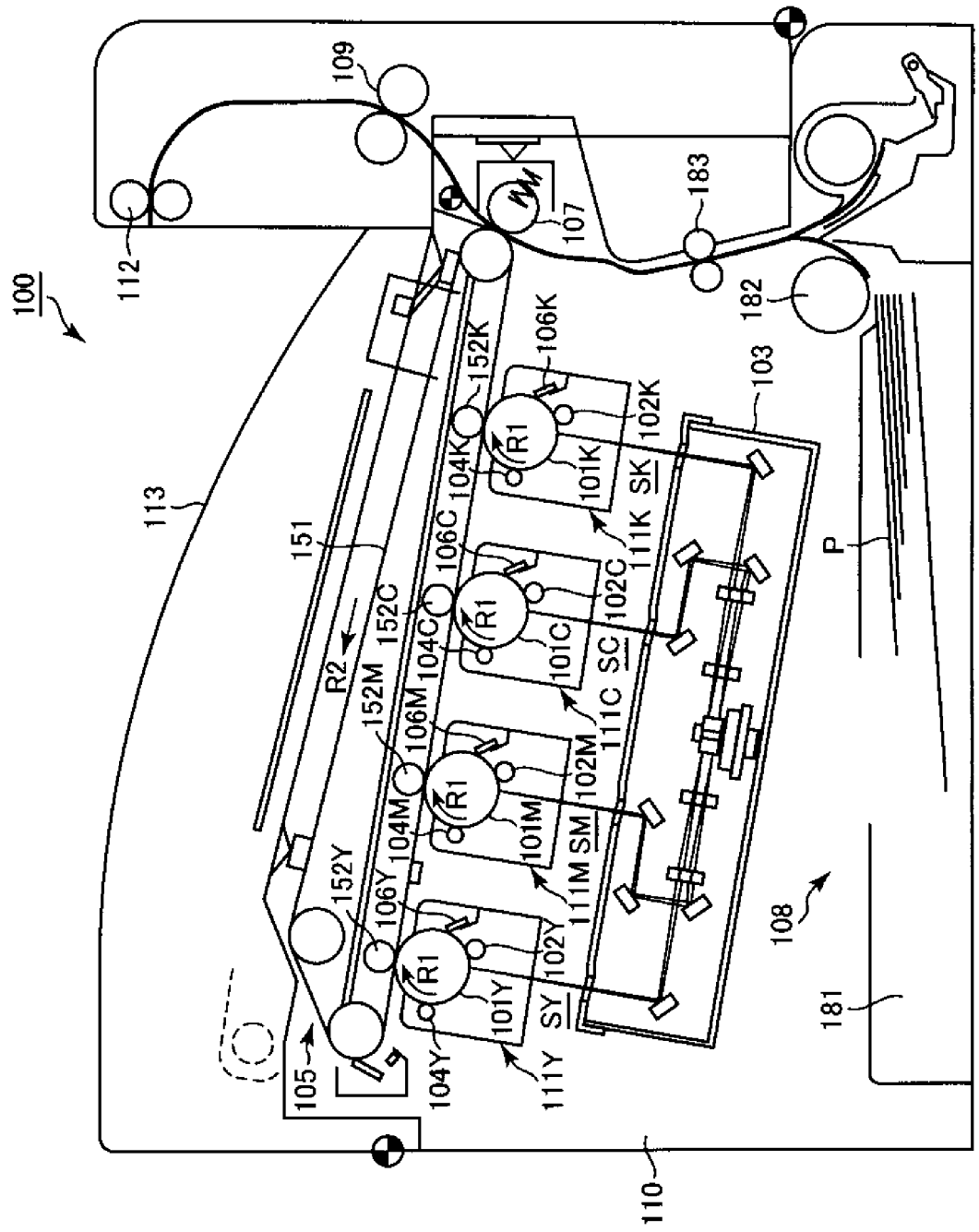
FIG. 1 is a schematic sectional view showing a general structure of an example of an image forming apparatus in which a filter assembly in an Embodiment of the present invention is used.

A filter frame according to the present invention used in a filter assembly will be described specifically with reference to the drawings.
(Embodiment 1)
In this embodiment, the filter frame according to the present invention is implemented as a filter frame for a dust collecting filter of the filter assembly provided in an exhaust path of an exhaust duct of an image forming apparatus.
1. Image Forming Apparatus First, a general structure and an operation of the image forming apparatus in the present invention will be described. FIG. 1 is a schematic sectional view showing the general structure of an image forming apparatus 100 in this embodiment. The image forming apparatus 100 in this embodiment is a laser beam printer of an intermediary transfer type in which a full-color image can be formed by using electrophotography.

The image forming apparatus 100 includes, as a plurality of image forming portions, first to fourth image forming portions (stations) SY, SM, SC and SK for forming toner images of yellow (Y), magenta (M), cyan (C) and black (K), respectively. The image forming portions SY, SM, SC and SK have the substantially same constitution and operation except that colors of toners used are different from each other. Therefore, in the following, suffixes Y, M, C and K for illustrating elements for associated colors are omitted unless otherwise specified, and the elements will be collectively described.

The image forming portion S includes a photosensitive drum 101 which is a cylindrical electrophotographic photosensitive member as an image bearing member. At a periphery of the photosensitive drum 101, a roller-type charger 102 as a charging means, a developing device 104 as a developing means and a cleaner 106 as a cleaning means are provided. In this embodiment, the photosensitive drum 101, and as process means actable on the photosensitive drum 101, the charger 102, the developing device 104 and the cleaner 106 are integrally assembled into a unit as a process cartridge 111 detachably mountable to an apparatus main assembly 110 of the image forming apparatus 100.

Further, below the process cartridges 111 in FIG. 1, an exposure device (laser scanner) 103 as an exposure means is provided so that each of the photosensitive drums 101 can be exposed to light in accordance with image information.

Further above the process cartridges 111 in FIG. 1, an intermediary transfer unit 105 is provided. The intermediary transfer unit 105 includes an intermediary transfer belt 151, formed with an endless belt member as an intermediary transfer member, provided so as to be contactable to the photosensitive drums 101. The intermediary transfer belt 151 is extended around a plurality of supporting rollers with predetermined tension. Further, a primary transfer roller 152 as a primary transfer means is provided at a position opposing an associated one of the photosensitive drums 101 in an inner peripheral surface side of the intermediary transfer belt 151. Further, a secondary transfer roller 107 as a secondary transfer means is provided at a position opposing one of the supporting rollers for the intermediary transfer belt 151 in an outer peripheral surface side of the intermediary transfer belt.

In addition, the image forming apparatus 100 includes a feeding portion 108 as a feeding means for feeding a sheet (recording material or a transfer(-receiving) material) P as a recording sheet, and includes a fixing device 109 as a fixing means for fixing the toner image on the sheet P.

For example, during full-color image formation, each photosensitive drum 101 is rotated in an arrow R1 direction in FIG. 1. The surface of each rotating photosensitive drum 101 is uniformly charged by the corresponding charger 102. The charged photosensitive drums 101 are exposed to color-separated component light images of yellow, magenta, cyan and black by the exposure device 103. As a result, on the photosensitive drums 101, electrostatic latent images for yellow, magenta, cyan and black are formed. The electrostatic latent images formed on the photosensitive drums 101 are developed with toners as developers by the developing devices 104. As a result, on the photosensitive drums 101, the toner images for yellow, magenta, cyan and black are formed.

Thereafter, with rotation of the photosensitive drums 101, the toner images reach associated nips (primary transfer portions) formed by contact of the intermediary transfer belt 151 with the associated photosensitive drums 101. Then, the toner images are successively transferred (primary-transferred) onto the moving intermediary transfer belt 151 by the action of the associated primary transfer rollers 152 provided opposed to the associated photosensitive drums 101. At this time, to each of the primary transfer rollers 152, a primary transfer bias is applied from an electrical substrate provided in the apparatus main assembly 110.

On the other hand, at the feeding portion 108, the sheets P accommodated in a feeding cassette 181 are fed one by one by a pick-up roller 182. Thereafter, at the feeding portion 108, the sheet P is turned to image formation by a registration roller pair 183, and then is conveyed to a nip (secondary transfer portion) formed by contact between the secondary transfer roller 107 and the intermediary transfer belt 151. Then, the toner images on the intermediary transfer belt 151 are collectively transferred (secondary-transferred) onto the sheet P by the action of the secondary transfer roller 107.

Thereafter, the sheet P on which the toner images are transferred is conveyed into the fixing device 109, where the toner images are subjected to heat and pressure application and thus are fixed on the sheet P. As a result, the toners for the respective colors are melted and mixed and thus are fixed on the sheet P, so that a full-color print image is obtained. Thereafter, the sheet P is discharged onto a discharge tray 113 as a discharge portion by a discharging roller pair 112 as a discharging feeding means provided downstream of the fixing device 109 with respect to a sheet feeding direction.

Arrangement of the respective portions in the image forming apparatus 100 in this embodiment is roughly as follows. From a lower portion of the apparatus main assembly 110, the feeding cassette 181, the exposure device 103, the process cartridges 111, the intermediary transfer unit 105, the fixing device 109 and the discharge tray 113 are disposed in the listed order.

Incidentally, in a recent copying machine market, digitalization proceeds, and in a printer market, upsizing and speed up of the printer proceed. With these, the number of positions where electrical parts (components), such as a motor, a fan and a power source substrate, to be used in the copying machine or a printer (or the number of the electrical parts) is increased. For example, the image forming apparatus of the electrophotographic type as in this embodiment has multi functions, and therefore the upsizing and the speed up of the image forming apparatus proceed due to an increase in the number of various constituent elements, or the like. Further, in the apparatus main assembly of the image forming apparatus, the number of electrical parts as a heat source is further increased, so that the exhaust duct is required to provide a higher exhaust efficiency in order to increase a temperature in the apparatus main assembly.

Further, due to upsizing and speed-up of the image forming apparatus with an increase in multi-functionality, in order to ensure higher exhausting efficiency and high dust collecting efficiency of an exhaust duct, periodical maintenance of the dust collecting filter, i.e., periodical exchanging (replacing) operation of the dust collecting filter is required. Further, in the case where a frequency of exchanging of the dust collecting filter contaminated by the duct collection is increased or in the like case, it is important to improve operativity (workability) such as provision and exchange or the like of the dust collecting filter.

2. Structure of Dust Collecting Filter

Next, a structure of a dust collecting filter as a filter assembly including a filter frame according to the present invention in this embodiment will be described.

Figure 2:
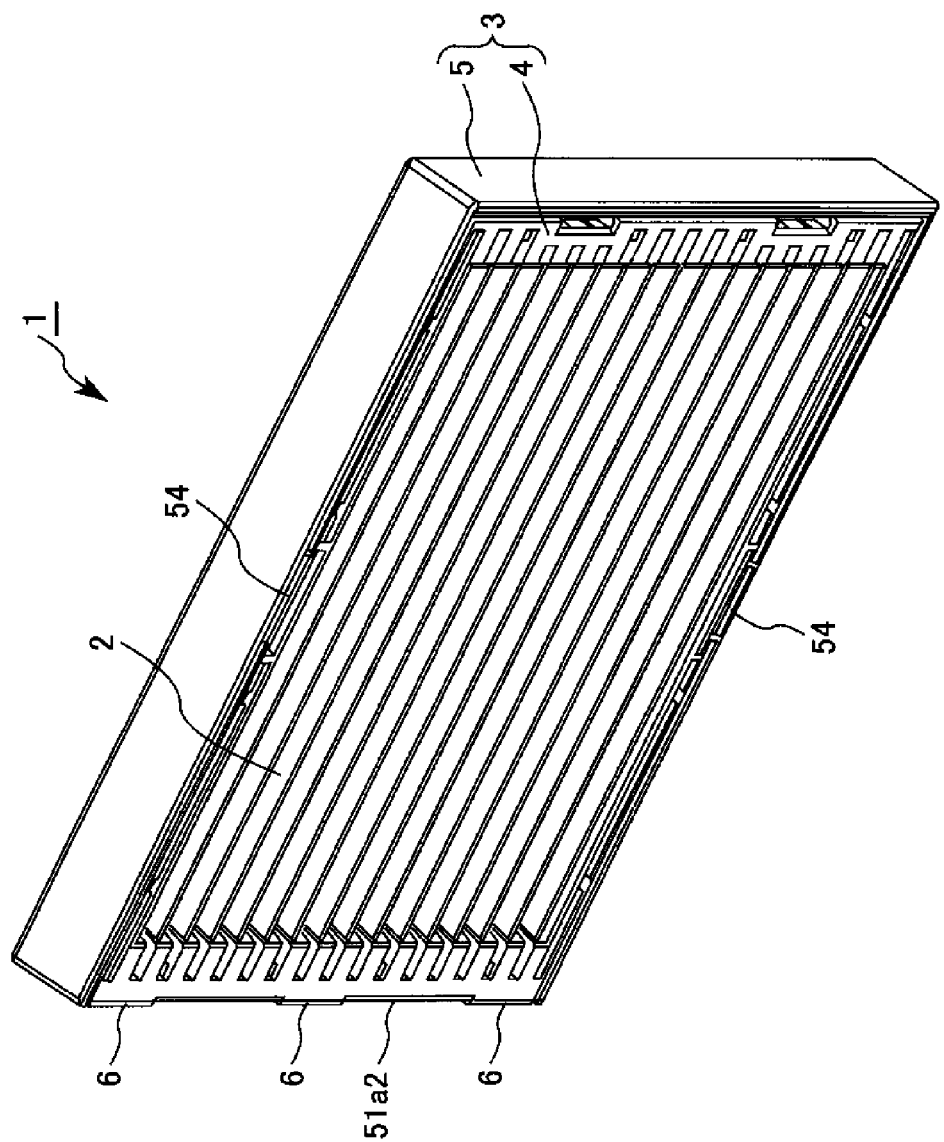
FIG. 2 is a perspective view of the filter assembly in the Embodiment.

FIG. 2 is a perspective view of a dust collecting filter 1 in this embodiment. The dust collecting filter 1 includes a filter 2 provided with a plurality of folds so as to alternately form ridges and troughs in a saw-tooth shape and a filter frame 3, which includes a first frame portion 4 and a second frame portion 5, for holding the filter 2 between the first and second frame portions 4 and 5. FIG. 2 shows a state in which the filter 2 is mounted in the filter frame 3 according to the present invention.

Figure 3:
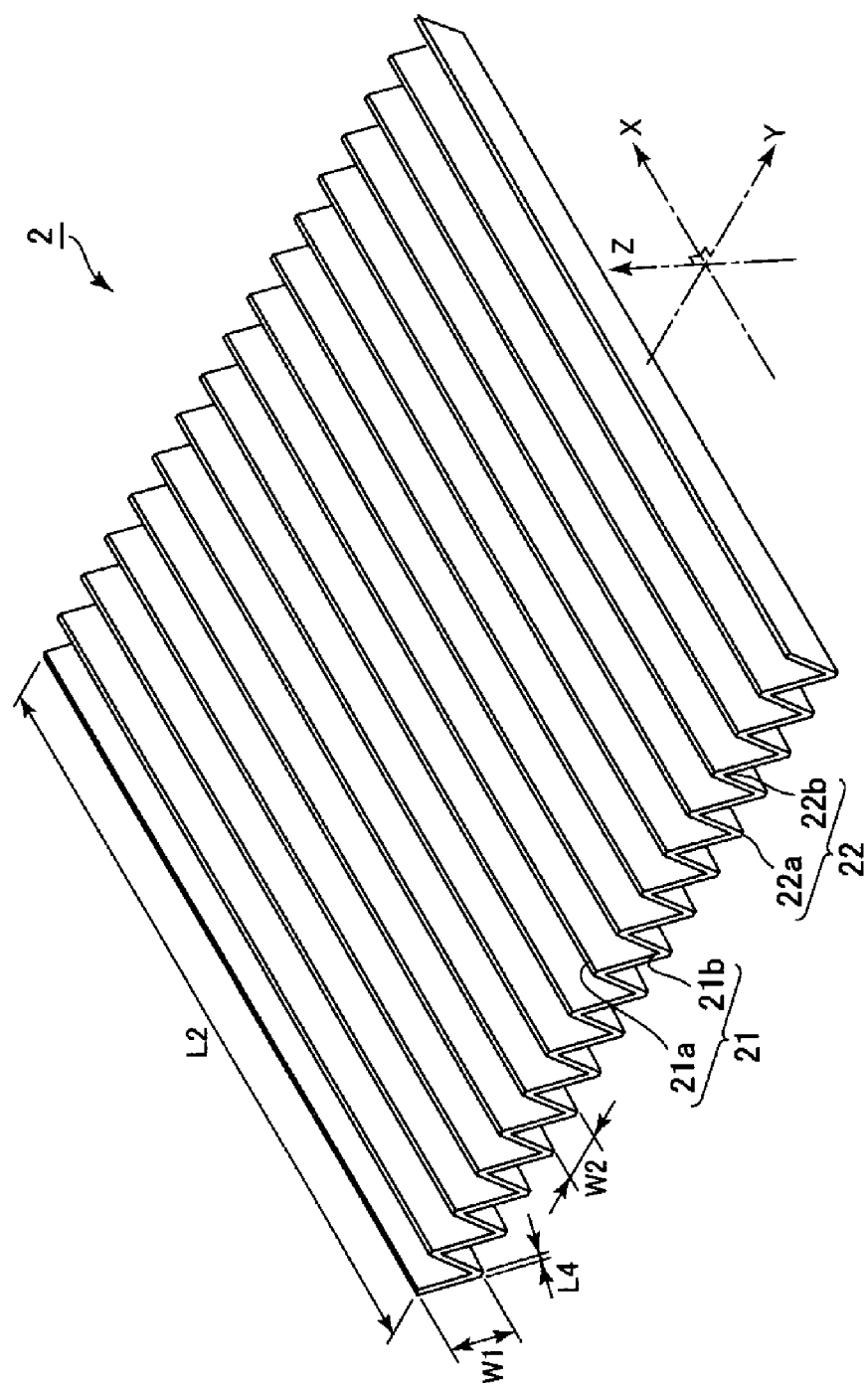
FIG. 3 is a perspective view of a filter of the filter assembly in the Embodiment.

FIG. 3 is a perspective view of the filter 2. The filter (filter medium) 2 is, as described above, provided with the plurality of folds so as to alternately from the ridges and the troughs, i.e., is subjected to pleating. A first side 21 of the pleated filter 2 is provided with ridges 21a and troughs 21b, and a second side 22 opposite from the first side 21 is also provided with ridges 22a and troughs 22b. Specifically, in this embodiment, the filter 2 has, before being creased, a pleated shape such that a substantially rectangular planar (sheet-like) original fabric is creased to provide a plurality of substantially parallel folds so as to alternately from the ridges and troughs. In this embodiment, a fold width W1 (length from a ridge to an adjacent trough with respect to a direction substantially perpendicular to a fold (extending) direction X described later along the side of the filter 2) in the pleating is substantially equal, and also a pitch W2 (width between adjacent ridges or adjacent troughs along a principal flat plane XY described later) is substantially equal.

Here, for convenience, a flat plane which is parallel to a first flat plane including the plurality of ridges 21a of the first side 21 of the filter 2 and a second flat plane including the plurality of ridges 22a of the second side 22 of the filter 2 and which passes between these (first and second) flat planes is referred to as the principal flat plane XY. Further, an extension direction of each of the ridges 21a and 22a and the troughs 21b and 22b formed by the pleating is referred do as the fold direction X of the pleating.

The filter 2 may be any available filter having a dust collecting characteristic, but is in general a filter which is formed of nonwoven or woven fabric and which has at least one dust collecting layer. Further, the dust collecting layer may also include a reinforcing layer for reinforcing the filter or maintaining a pleated shape.

Incidentally, a cross-sectional shape of the filter 2 with respect to direction substantially perpendicular to the principal flat plane XY of the ridges 21a and 22a and the troughs 21b and 22b as seen along the fold direction X is a substantially triangular shape. A top of each of the ridges 21a and 22a and a bottom of each of the troughs may also have an edge shape or a waveform shape provided with a rounded shape (curved shape). Further, in this embodiment, the filter 2 has a substantially rectangular shape (substantially square shape in this embodiment) as a whole when the filter 2 is viewed along the direction substantially perpendicular to the principal flat plane XY. The filter 2 has a predetermined thickness L4, but is partly compressed by being sandwiched between the first and second frame portions 4 and 5 of the filter frame 3 as described later.

Figure 4:
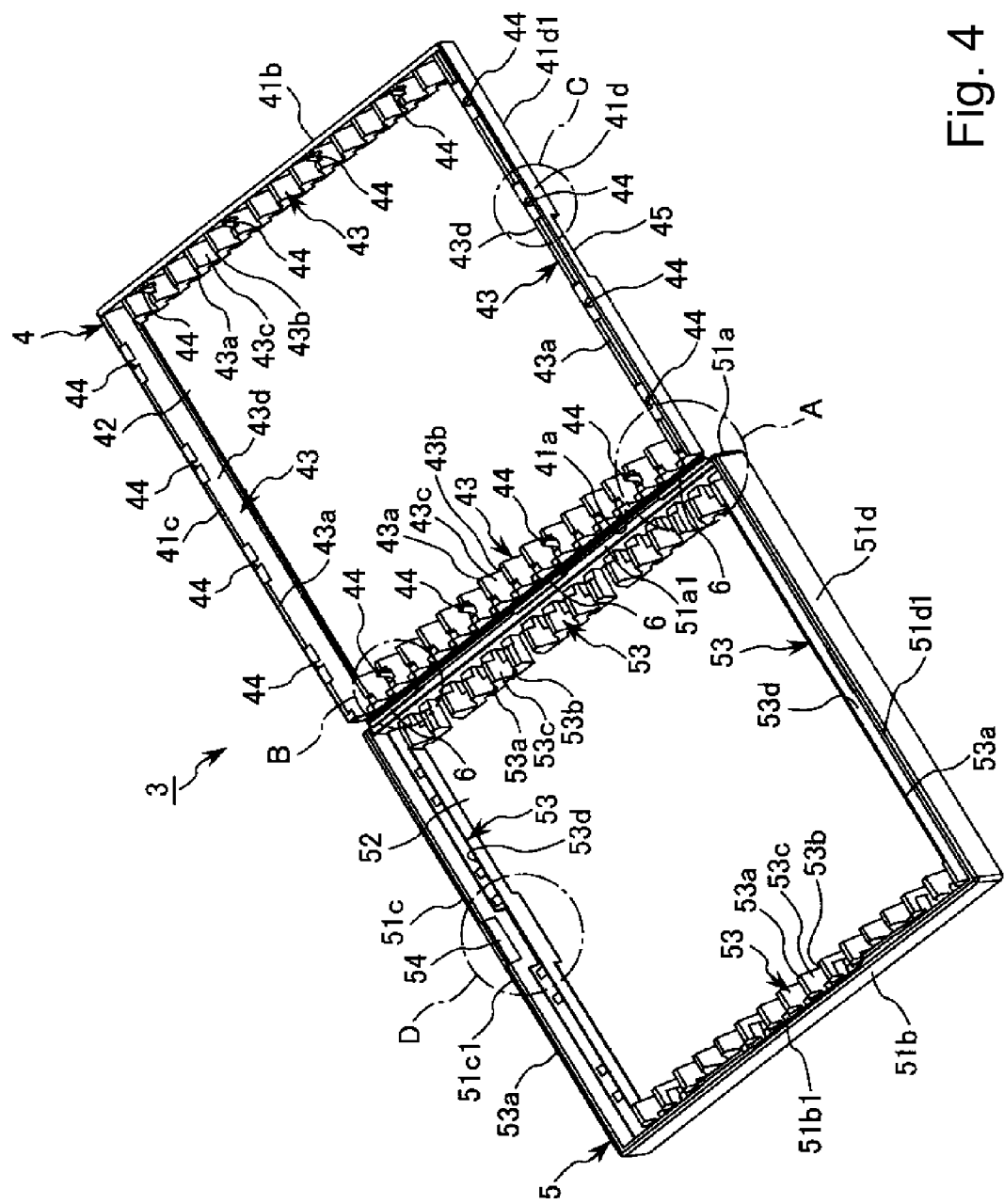
FIG. 4 is a perspective view of a filter frame, according to the Embodiment of the present invention, of the filter assembly.
Figure 5:
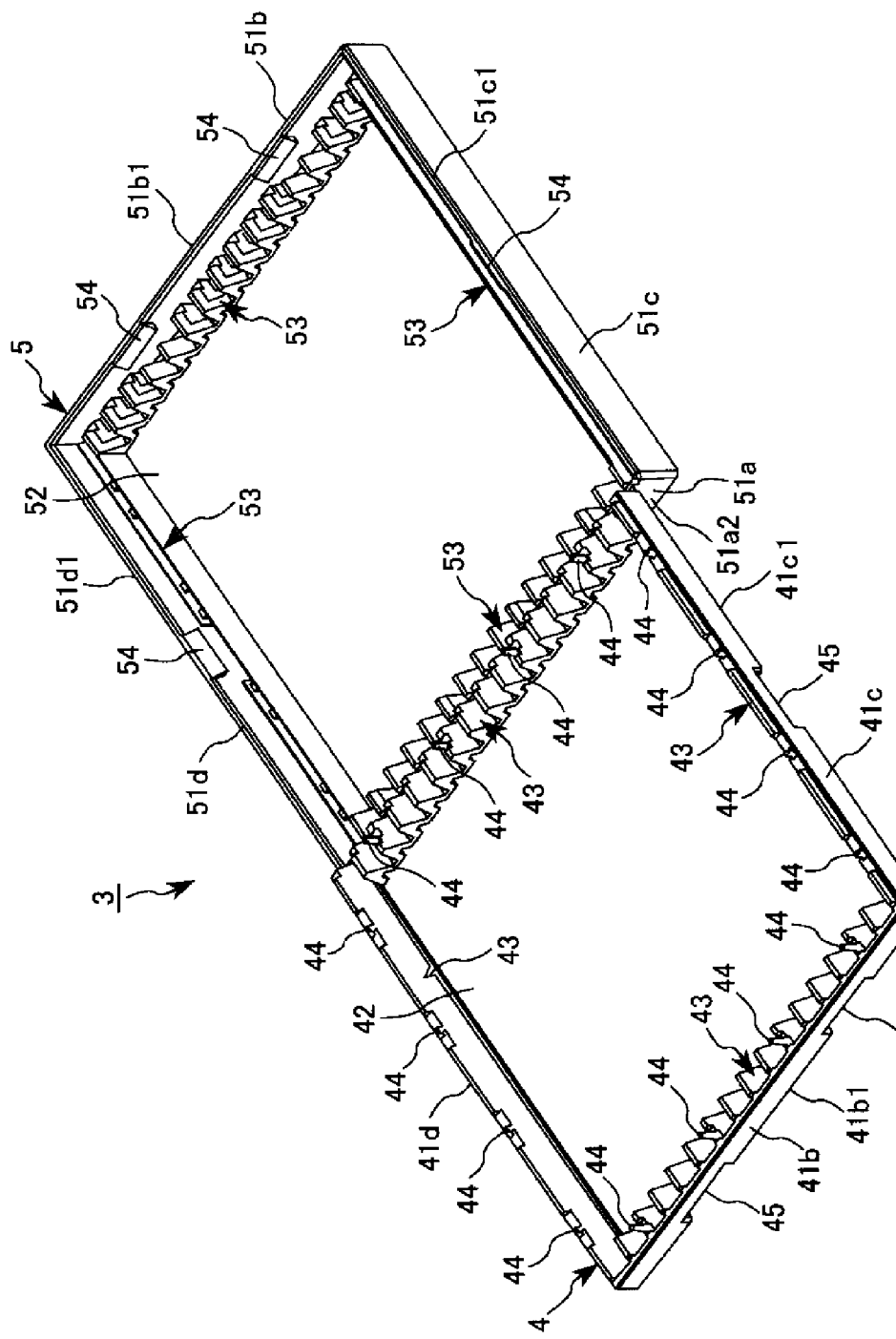
FIG. 5 is a perspective view of a filter frame, according to the Embodiment of the present invention, of the filter assembly.
Figure 6:
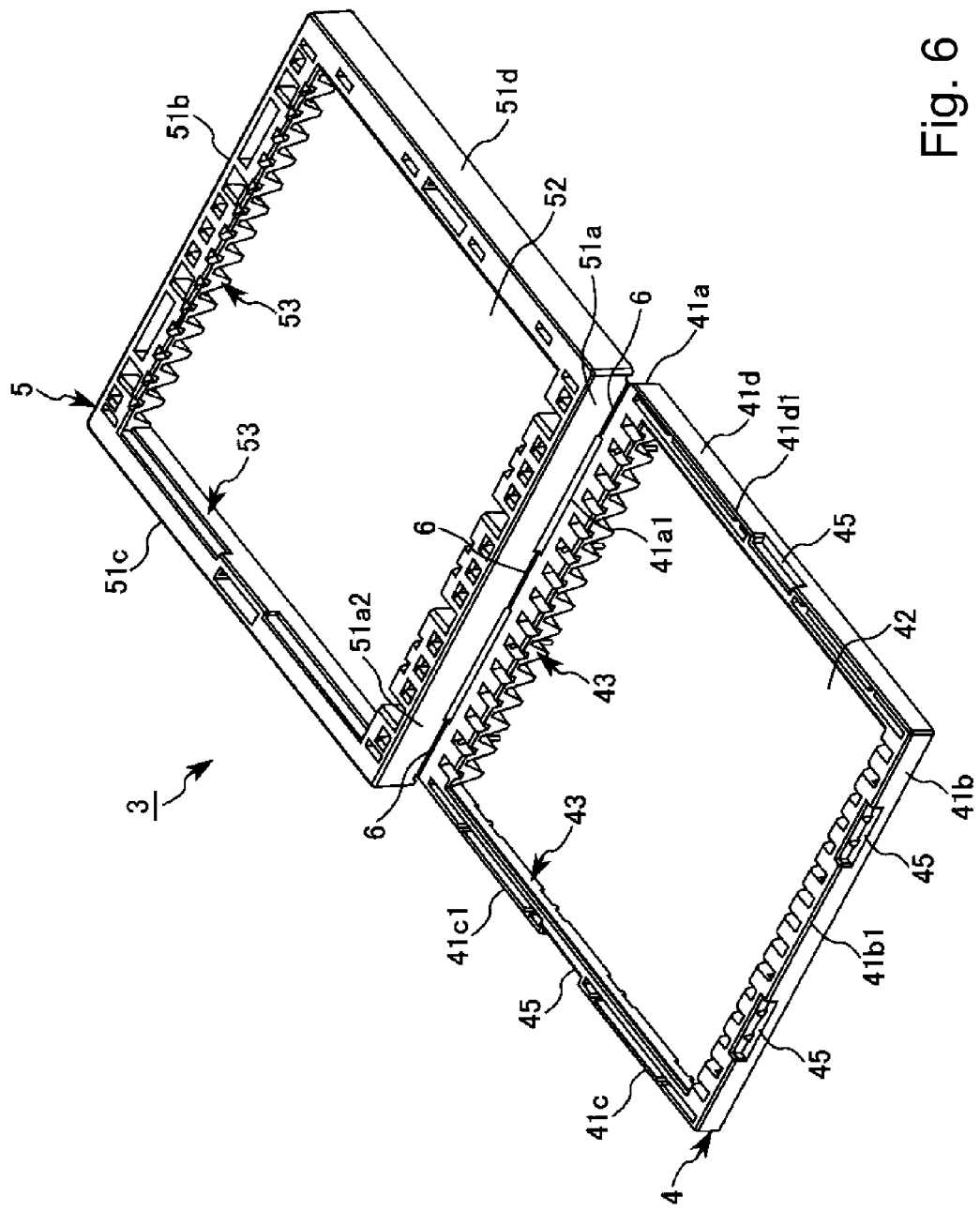
FIG. 6 is a perspective view of a filter frame, according to the Embodiment of the present invention, of the filter assembly.
Figure 7:
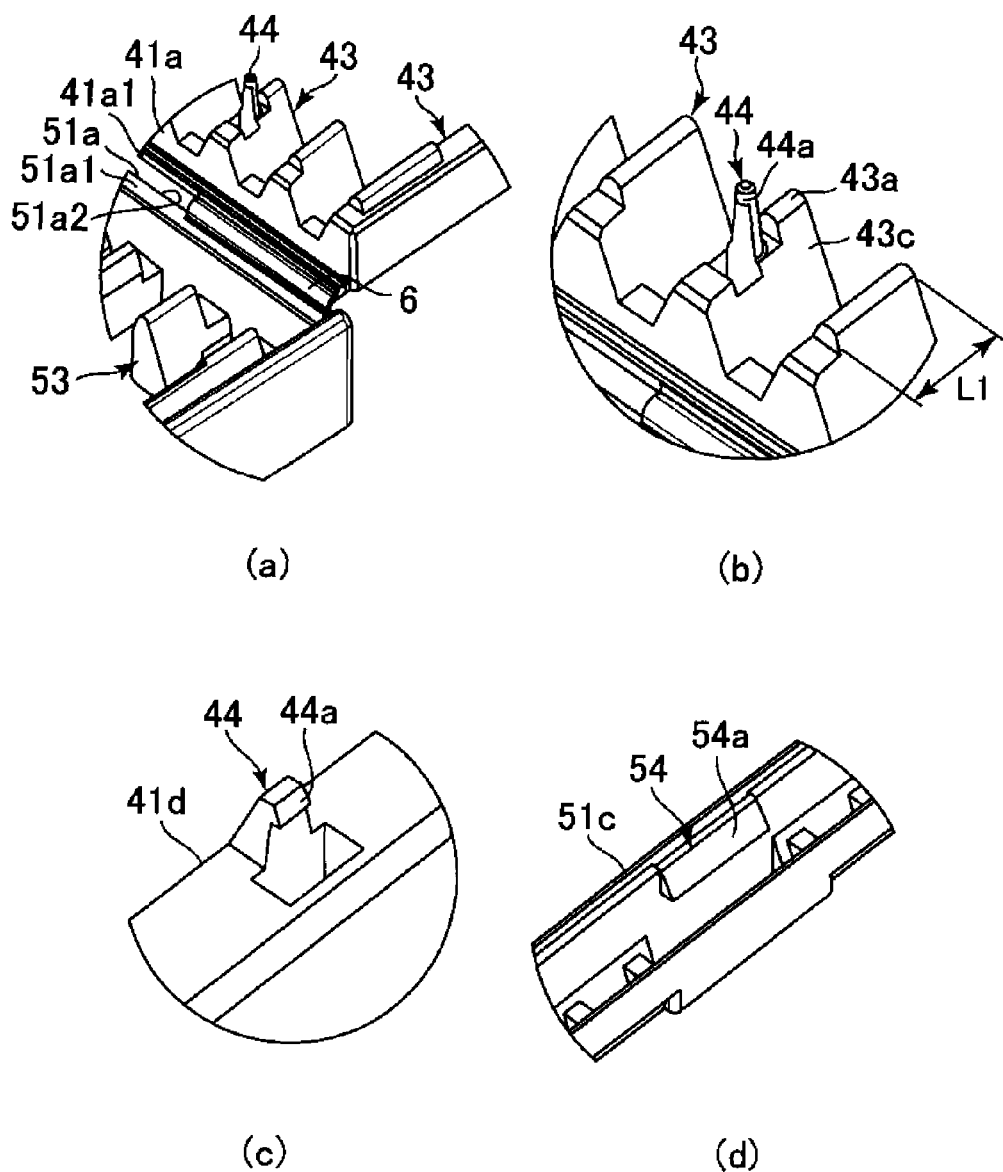
In FIG. 7, (a) to (d) are enlarged views of portions A to D, respectively, of the filter frame shown in FIG. 4.

FIGS. 4 to 6 are perspective views each showing the filter frame 3 in a state in which the filter 2 is not mounted. FIG. 4 is the perspective view of the filter frame 3, in a state in which the first and second frame portions 4 and 5 are open, as seen from a side where the filter 2 is to be mounted when the second frame portion 5 is disposed in the front side. FIG. 5 is the perspective view similar to FIG. 4, but shows the filter frame 3 as seen from the side where the filter 2 is to be mounted when the first frame portion 4 is disposed in the front side. FIG. 6 shows the filter frame 3 as seen from a side, opposite from the side where the filter 2 is to be mounted, when the first frame portion is disposed in the front side. Further, (a) to (d) of FIG. 7 are detailed views of respective portions of filter frame 3, and show portions A to D, respectively, in FIG. 4 in an enlarged state.

The first frame portion 4 has a roughly rectangular frame structure having outer side walls (outer peripheral frames) 41 (41a, 41b, 41c, 41d) provided so as to surround a periphery of the filter 2. The first frame portion 4 is provided, at a central portion, with an opening 42 where the first side 21 of the filter 2 is exposed to an outside of the filter frame 3.

Similarly, the second frame portion 5 has a roughly rectangular frame structure having outer side walls (outer peripheral frames) 51 (51a, 51b, 51c, 51d) provided so as to surround a periphery of the filter 2. The second frame portion 5 is provided, at a central portion, with an opening 52 where the first side 22 of the filter 2 is exposed to an outside of the filter frame 3. That is, each of the first and second frame portions 4 and 5 includes four outer side walls each having a predetermined depth (height) along the direction substantially perpendicular to the principal flat plane XY of the filter 2. In this embodiment, when the filter frame 3 holding the filter 2 is viewed along the direction substantially perpendicular to the principal plat plane XY, each of the first and second frame portions 4 and 5 has a substantially rectangular shape (substantially square shape in this embodiment) as a whole. Further, each of the openings 42 and 52 of the first and second frame portions 4 and 5 has a substantially rectangular shape (substantially square shape in this embodiment) as seen along the direction substantially perpendicular to the principal flat plane XY of the filter 2. Through these openings 42 and 52, most portions of the first and second sides 21 and 22, respectively, of the filter 2 are exposed to the outside of the filter frame 3. Further, in this embodiment, the first frame portion 4 is roughly formed so as to be engaged and fitted inside the second frame portion 5 in a nested state, and in this fit-in state, holds the filter 2 between the first and second frame portions 4 and 5.

Here, for convenience, of the four outer side walls 41a to 41d of the first frame portion 4, the two outer side walls disposed in both end sides with respect to the fold direction X of the filter 2 are referred to as fold end portion outer side walls 41a and 41b. Further, of the four outer side walls 41a to 41d of the first frame portion 4, the two outer side walls disposed in both end sides with respect to the direction substantially perpendicular to the fold direction X of the filter 2 are referred to as fold direction outer side walls 41c and 41d, Similarly, of the four outer side walls 51a to 51d of the second frame portion 5, the two outer side walls disposed in both end sides with respect to the fold direction X of the filter 2 are referred to as fold end portion outer side walls 51a and 51b. Further, of the four outer side walls 51a to 51d of the second frame portion 5, the two outer side walls disposed in both end sides with respect to the direction substantially perpendicular to the fold direction X of the filter 2 are referred to as fold direction outer side walls 51c and 51d, The first frame portion 4 includes a first holding portion 43 having a side corresponding to the first side 21 of the filter 2 and a second holding portion 44, provided on the first holding portion 43, for determining a position of the filter 2. Further, the second frame portion 5 includes a second holding portion 53 for holding the filter 2 by sandwiching the filter 2 between the first and second holding portions 43 and 44. The second holding portion 53 is provided so as to oppose the first holding portion 43 via the filter 2 and has a side corresponding to the second side 22 of the filter 2.

Incidentally, each of the sides, of the first and second holding portions 43 and 53, corresponding to the first and second sides 21 and 22 of the filter 2 does not mean only a side completely following (contacting) a shape of the corresponding side of the filter 2. Each of the sides may only be required to be a side including a portion following (contacting) the corresponding side of the filter 2 to the extent that the first and second holding portions 43 and 53 can sandwich and hold the filter 2 therebetween without difficulty to sufficiently maintain the pleated shape of the filter 2 and thus the characteristic of the filter 2 can be sufficiently achieved.

Further, in this embodiment, the first holding portion 43 is provided with ridges 43a and troughs 43b formed so as to be complementarily engaged with the ridges 21a and the troughs 21b of the first side 21 of the filter 2 subjected to the pleating. In this embodiment, the first holding portion 43 is provided correspondingly to each of both end portions of the filter 2 with respect to the fold direction X of the pleated filter 2 and each of both end portions of the filter 2 with respect to the direction substantially perpendicular to the fold direction X of the pleated filter 2. That is, first, the first frame portion 4 includes the first holding portion 43 extending from each of the fold end portion outer side walls 41a and 41b toward the opening 42 with a predetermined width. This first holding portion 43 is a holding portion provided at a plurality of positions spaced from each other with respect to the fold direction X of the pleating. This first holding portion 43 receives the first side 21 in a predetermined range at each of the end portions of the filter 2 with respect to the fold direction X by inclined sides 43c, each connecting the top of the ridge 43a and the bottom of the adjacent trough 43b, constituting the ridges 43a and the troughs 43b formed along a longitudinal direction of each of the fold end portion outer side walls 41a and 41b. Further, the first frame portion 4 includes the first holding portion 43, extending over the substantially whole region of each of the fold direction outer side walls 41c and 41d with respect to the longitudinal direction, provided in a side where the operation 42 is provided inside each of the outer side walls 41c and 41d. This first holding portion 43 has a terminal holding side 43d for receiving the first side 21 of the filter over the substantially entire region with respect to the fold direction X at each of terminal portions with respect to the direction substantially perpendicular to the fold direction X of the filter 2.

Further, in this embodiment, the second holding portion 53 is provided with ridges 53a and troughs 53b. The ridges 53a and the troughs 53b are provided so as to oppose the first holding portion 43 via the filter 2, and are formed so as to be complementarily engaged with the ridges 22a and the troughs 22b of the first side 22 of the filter 2 subjected to the pleating. In this embodiment, the second holding portion 53 is provided, so as to oppose the first holding portion 43 via the filter 2, correspondingly to each of both end portions of the filter 2 with respect to the fold direction X of the pleated filter 2 and each of both end portions of the filter 2 with respect to the direction substantially perpendicular to the fold direction X of the pleated filter 2. That is, first, the second frame portion 5 includes the second holding portion 53 extending from each of the fold end portion outer side walls 51a and 51b toward the opening 52 with a predetermined width. This second holding portion 53 is a holding portion provided at a plurality of positions spaced from each other with respect to the fold direction X of the pleating. This second holding portion 53 receives the second side 22 in a predetermined range at each of the end portions of the filter 2 with respect to the fold direction X by inclined sides 53c, each connecting the top of the ridge 53a and the bottom of the adjacent trough 53b, constituting the ridges 53a and the troughs 53b formed along a longitudinal direction of each of the fold end portion outer side walls 51a and 51b. Further, the second frame portion 5 includes the second holding portion 53, extending over the substantially whole region of each of the fold direction outer side walls 51c and 51d with respect to the longitudinal direction, provided in a side where the operation 52 is provided inside each of the outer side walls 51c and 51d. This second holding portion 53 has a terminal holding side 53d for receiving the second side 22 of the filter over the substantially entire region with respect to the fold direction X at each of terminal portions with respect to the direction substantially perpendicular to the fold direction X of the filter 2.

Incidentally, a length L1 ((b) of FIG. 7), with respect to the fold direction X of the filter 2, of each of the filter 2 receiving sides of the first and second holding portions 43 and 53 provided adjacently to the fold end portion outer side walls 41a, 41b, 51a and 51b is set in the following manner. That is, the length L1 is set so that a sufficient force for holding the filter 2 can be obtained, and at the same time, the filter 2 can be sufficiently exposed from the filter frame 3. Further, in this embodiment, the filter 2 receiving sides of the first and second holding portions 43 and 53 provided adjacently to the fold end portion outer side walls 41a, 41b, 51a and 51b are provided continuously over the substantially entire region of a corresponding outside surface with respect to the longitudinal direction. However, each of these first and second holding portions 43 and 53 may also be divided into a plurality of portions with respect to the same direction, and may also be provided partly with respect to the same direction. Further, in a state in which the first and second frame portions 4 and 5 hold the filter 2, a gap (spacing) L3 ((b) of FIG. 10) between the first and second holding portions 43 and 53 is set in the following manner. That is, the gap L3 is set so that the sufficient (filter 2) holding force can be obtained, and at the same time, it is possible to sufficiently suppress a lowering in operativity of an operation for closing the filter frame 3.

Further, either one or both of the first and second holding portions 43 and 53 may also receive the corresponding side of the filter 2 by the tops of the associated ridges or the bottoms of the associated troughs in addition to or in place of the inclined sides 43c and 53c and the terminal holding sides 43d and 53d.

In this embodiment, the developing portion 44 is provided so as to project from the first holding portion 43 of the first frame portion 4 toward the filter. Further, in this embodiment, the positioning portion 44 penetrates through the filter 2 disposed on the holding portion 43. Further, in this embodiment, the positioning portion 44 includes a locking portion (claw-shaped portion) 44a ((b) and (c) of FIG. 7) for locking the filter 2 disposed on the first holding portion 43.

Further, in this embodiment, a plurality (four in this embodiment) of positioning portions 44 are provided and positioned at top portions of the plurality of ridges 43a of the first holding portion 43 provided adjacently to each of the fold end portion outer side walls 41a and 41b.

Further, in this embodiment, a plurality (four in this embodiment) of positioning portions 44 are provided, along the longitudinal direction of each of the fold direction outer side walls 41c and 41d, also at top portions of the plurality of ridges 43a of the first holding portion 43 provided adjacently to each of the fold direction outer side walls 41c and 41d.

Particularly, in this embodiment, as shown in (b) of FIG. 7, each of the positioning portions 44 provided adjacently to each of the fold end portion outer side walls 41a and 41b is a cylindrical ridge a part of which is cutaway, and thus the locking portion 44a is formed. Further, as shown in (c) of FIG. 7, each of the positioning portions 44 provided adjacently to each of the fold direction outer side walls 41c and 41d is a prism ridge a part of which is cutaway, and thus the locking portion 44a is formed.

In this way, in this embodiment, each of the positioning portions 44 has a returning-preventing shape (self-locking shape) so that the filter 2 provided on the first holding portion 43 is not disconnected from the positioning portion 44.

Incidentally, in this embodiment, the positioning portions 44 are formed in a cylindrical shape or a prism shape but may also be formed uniformly in either one of these shapes. Further, the positioning portions 44 may also have other shapes such as a pointed conical shape (needle-like shape), a quadrangular pyramid shape and a triangular pyramid shape. In this case, even when each of the positioning portions 44 is not provided with the locking portion (claw-shaped portion), the positioning portion 44 is capable of positioning the filter 2 disposed on the first holding portion 43 by simply penetrating through the filter 2.

Figure 8:
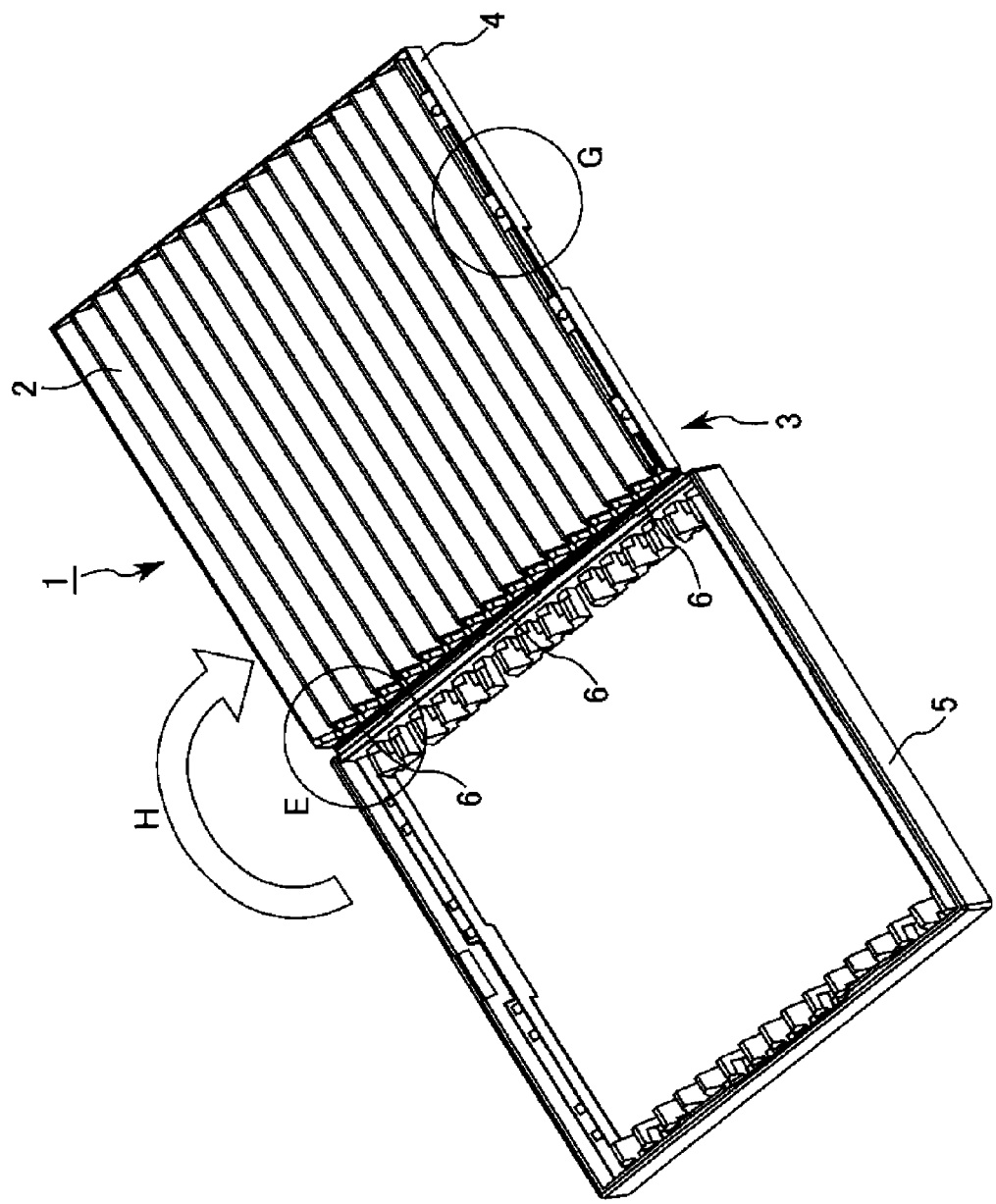
FIG. 8 is a perspective view of the filter assembly for illustrating an assembling procedure of the filter assembly in the Embodiment.

Incidentally, in this embodiment, the first and second frame portions 4 and 5 are rotatably connected with each other by a hinge portion 6. That is, the filter frame 3 includes the hinge portion 6 for rotatably connecting the first and second frame portions 4 and 5 with each other. In this embodiment, the hinge portion 6 is provided so as to connect the fold end portion outer side wall 41a of the first frame portion 4 and the fold end portion outer side wall 51a of the second frame portion 5 with each other. As a result, each of the first and second frame portions 4 and 5 is openable in a sector shape (FIG. 8). Particularly, in this embodiment, as shown in (a) of FIG. 7, the hinge portion 6 is formed with a band-like member capable of being bent. Further, the hinge portion 6 is connected with the fold end portion outer side wall 51a of the second frame portion 5 at one end portion thereof and is connected with the fold end portion outer side wall 41a of the first frame portion 4 at the other end portion thereof.

In this embodiment, the hinge portion 6 is provided, inside (toward the opening 52) the fold end portion outer side wall 51a with respect to a thickness direction, on an upper end surface 51a1 of the fold end portion outer side wall 51a of the second frame portion 5. The upper end surface 51a1 of the fold end portion outer side wall 51a of the second frame portion 5 is positioned in a side where the first side 21 of the filter 2 is provided with respect to a depth (height) direction substantially perpendicular to the principal flat plane XY of the filter 2. Further, the hinge portion 6 is provided adjacently to an edge portion 41a1 at a lower portion (in the side where the first side 2 of the filter 2 is provided with respect to the depth direction substantially perpendicular to the principal flat plane XY of the filter 2) at an outer peripheral surface of the fold end portion outer side wall 41a of the first frame portion 4. When the filter 2 is held, the first frame portion 4 is engaged and fitted inside the second frame portion 5, and therefore at that time, the edge portion 41a of the first frame portion 4 is disposed inside (toward the opening 52) the fold end portion outer side wall 51a of the second frame portion 5. As a result, as shown in FIG. 2, the hinge portion 6 does not protrude from an outer peripheral surface 51a2 of the second frame portion 5 when the dust collecting filter 1 is formed. That is, in this embodiment, the hinge portion 6 is provided so as not to protrude from the outer peripheral surface 51a2 of the filter frame 3 holding the filter 2. Further, in this embodiment, the hinge portion 6 is provided so that a rotational axis direction of each of the first and second frame portions 4 and 5 is substantially perpendicular to the fold direction X of the pleating. As a result, as described specifically later, when the dust collecting filter 1 is assembled, the first and second frame portions 4 and 5 can be closed further simply.

Further, in this embodiment, the filter frame 3 includes a lock means for maintaining a state in which the filter 2 is held between the first and second frame portions 4 and 5. In this embodiment, the lock means includes a projected portion provided to at least one of the first and second frame portions 4 and 5 and a recessed portion provided to at least the other one of the first and second frame portions 4 and 5. Further, these projected and recessed portions are engaged with each other, so that the state in which the filter 2 is held between the first and second frame portions 4 and 5 is maintained. Particularly, in this embodiment, the second frame portion 5 is provided with an engaging claw 54 as the projected portion. Further, the first frame portion 4 is provided with an engaging groove 45 as the recessed portion engageable with the engaging claw 54 provided to the second frame portion 5. Further, these portions are elastically engaged with each other (snap-fitting).

Further, the engaging claw 54 is provided so as to project toward the opening 52 from an inner peripheral surface adjacent to each of upper end surfaces 51b1, 51c1 and 51d1 of the fold end portion outer side wall 51b and the fold direction outer side walls 51c and 51d, respectively, of the second frame portion 5. In this embodiment, the fold end portion outer side wall 51b is provided with two engaging claws 54, and each of the fold direction outer side walls 51c and 51d is provided with a single engaging claw 54. Further, the engaging groove 45 is provided so as to cut away each of lower edge portions 41b1, 41c1 and 41d1 of the fold end portion outer side wall 41b and the fold direction outer side walls 41c and 41d, respectively, of the first frame portion 4. Incidentally, the engaging claw 54 is, as shown in (d) of FIG. 7, provided with a tapered portion 54a such that a thickness of the tapered portion 54a is narrowed toward an upstream side of a direction in which the first frame portion 4 enters the second frame portion 5. As a result, when the dust collecting filter 1 is assembled, the first and second frame portions 4 and 5 can be closed further simply.

In this way, in this embodiment, the engaging claws 54 are provided on all the outer side walls 51b, 51c and 51d of the second frame portion 5 except for the outer side wall 51a provided with the hinge portion 6. Further, correspondingly to these engaging claws 54, the engaging grooves 45 are provided in all the outer side walls 41b, 41c and 41d of the first frame portion 4 except for the outer side wall 41a provided with the hinge portion 6. As a result, when the dust collecting filter 1 is formed, a filter 2 holding force generated by sandwiching the filter 2 between the first and second frame portions 4 and 5 can be maintained with high reliability.

Incidentally, the filter frame 3 may preferably be formed of plastic (synthetic resin material) such as polypropylene or nylon from the viewpoint of good moldability. In this embodiment, the filter frame 3 was formed of plastic.

3. Assembling of Dust Collecting Filter

Figure 10:
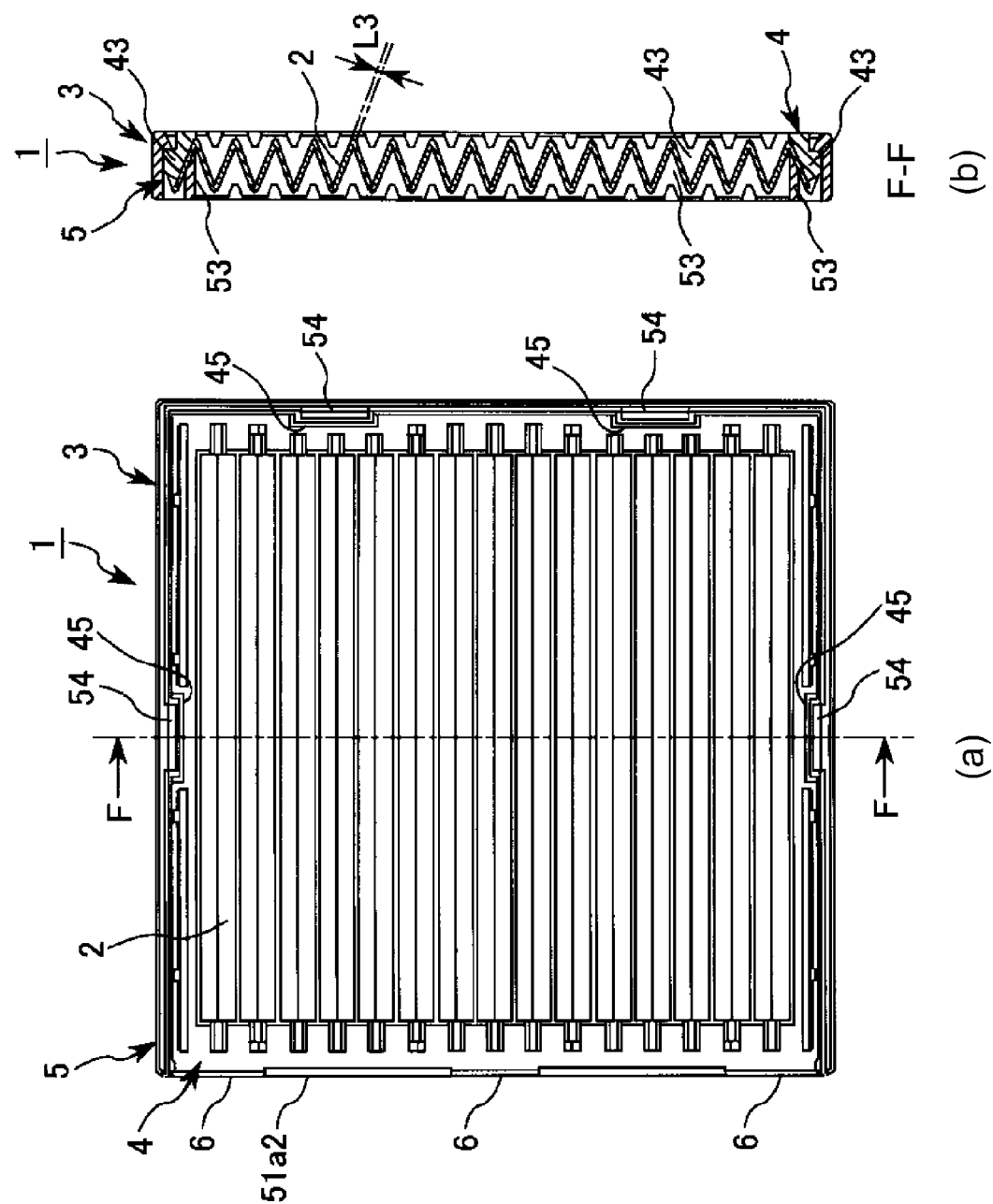
In FIG. 10, (a) is a side view of the filter assembly in the Embodiment, and (b) is a sectional view of the filter assembly taken along F-F line indicated in (a) of FIG. 10.

Next, with reference to FIGS. 8 to 10, an assembling procedure of the dust collecting filter 1 will be described. FIG. 8 is a perspective view showing a state before the filter 2 is disposed in the first frame portion 4 of the filter frame 3 and then the second frame portion 5 is closed to hold the filter 2 between the first and second frame portions 4 and 5. In FIG. 9, (a) is an enlarged view of portion E in FIG. 8, and (b) is an enlarged view of portion G in FIG. 8. In FIG. 10, (a) is a side view of the assembled dust collecting filter 1 as seen from the first frame portion 4 side along a direction substantially perpendicular to the principal flat plane XY of the filter 2, and (b) is a sectional view of the assembled dust collecting filter 1 taken along F-F line in (a) of FIG. 10.

As shown in FIG. 8, the filter 2 is disposed and positioned in the first frame portion 4 of the filter frame 3. At this time, first, the filter 2 is disposed so that the ridges and troughs 21a and 21b of the first side 21 of the filter 2 subjected to the pleating and the shape of the first holding portion 43 provided to the first frame portion 4 are adapted to each other. Then, as shown in (a) of FIG. 9, the filter 2 is passed through the positioning portions 44 provided adjacently to the fold end portion outer side walls 41a and 41b, whereby the filter 2 is positioned at a predetermined position of the first frame portion 4. Thereafter, as shown in (b) of FIG. 9, the filter 2 is passed, in the neighborhood of remaining end portions, through the positioning portions 44 provided adjacently to the fold direction outer side walls 41c and 41d, whereby the filter 2 is positioned at a predetermined position of the first frame portion 4 further firmly. Incidentally, holes through which the positioning portions 44 pass may be formed in the filter 2 in advance or may also be formed by the positioning portions 44 themselves when the filter 2 is provided in the first frame portion 4.

In this way, in this embodiment, the filter 2 is positioned at a proper position relative to the first frame portion 4. For that reason, it becomes possible to suppress a lowering in dust collecting efficiency due to protrusion of a part of the filter 2 from the filter frame 3 and partial overlapping of the filter 2 with the filter frame 3.

Then, after the filter is disposed and positioned in the first frame portion 4, as shown by an arrow H in FIG. 8, the second frame portion 5 is rotated around the hinge portion 6 as a rotation starting point. The rotated second frame portion 5 is fixed to the first frame portion 4 by engaging the engaging claws 54 provided thereon with the engaging grooves 45 provided in the first frame portion 4. As a result, the dust collecting filter 1 as shown in (a) of FIG. 10 is completed.

As shown in (b) of FIG. 10, the filter 2 is held by being sandwiched between the first and second holding portions 43 and 53 complementarily engaged with the filter 2 subjected to the pleating. For that reason, it is possible to suppress disconnection, deviation and the like of the filter 2 from the filter frame 3, so that dirt and dust can be collected with high reliability. Further, the filter 2 is held by being sandwiched between the first and second holding portions 43 and 53, and therefore there is no need to provide a particular part for holding the filter 2 by the filter frame 3, so that the filter 2 can be formed in a necessary minimum size.

4. Mounting and Exchange of Dust Collecting Filter

Next, with reference to FIGS. 11 and 12, a mounting procedure of the dust collecting filter 1 in the apparatus main assembly 110 of the image forming apparatus 100 and an exchanging procedure of the dust collecting filter 1 will be described.

First, when the dust collecting filter 1 is mounted, as shown in (a) of FIG. 12, a rectangular gap-filling member 7 is disposed so as to surround an outer peripheral surface (sides disposed so as to surround a periphery of the filter 2 with respect to an axial direction substantially perpendicular to the principal flat plane XY) of the filter frame 3 in which the filter 2 is mounted. This gap-filling member 7 suppresses leakage of the dirt and dust from an outer peripheral portion of the filter frame 3 holding the filter 2. The gap-filling member 7 is prepared by a soft material, e.g., an elastic member such as foamed elastic body (sponge) so that a gap between the filter frame 3 and a filter case 8 described later can be substantially filled completely by being appropriately deformed when the gap-filling member 7 is disposed between the filter frame 3 and the filter case 8. In this embodiment, as the gap-filling member 7, the sponge was used.

Thereafter, as shown in (b) of FIG. 12, the filter frame 3 to which the gap-filling member 7 is mounted is disposed at an inner peripheral portion of the filter case 8 having a substantially rectangular (square) shape. The filter case 8 is frame for permitting easy mounting the dust collecting filter 1 relative to an exhaust duct 116 described later.

In this way, in this embodiment, the gap-filling member 7 is mounted so as to cover the outer peripheral surface of the filter frame 3 by which the filter 2 is held, and then the filter case 8 is mounted so as to surround the periphery of the filter frame 3 in contact with an outer peripheral surface of the filter frame 3. In this case, a unit formed by assembling the filter frame 3 holding the filter 2, the gap-filling member 7 and the filter case 8 can be regarded as the dust collecting filter 1 which is a filter assembly.

Figure 11:
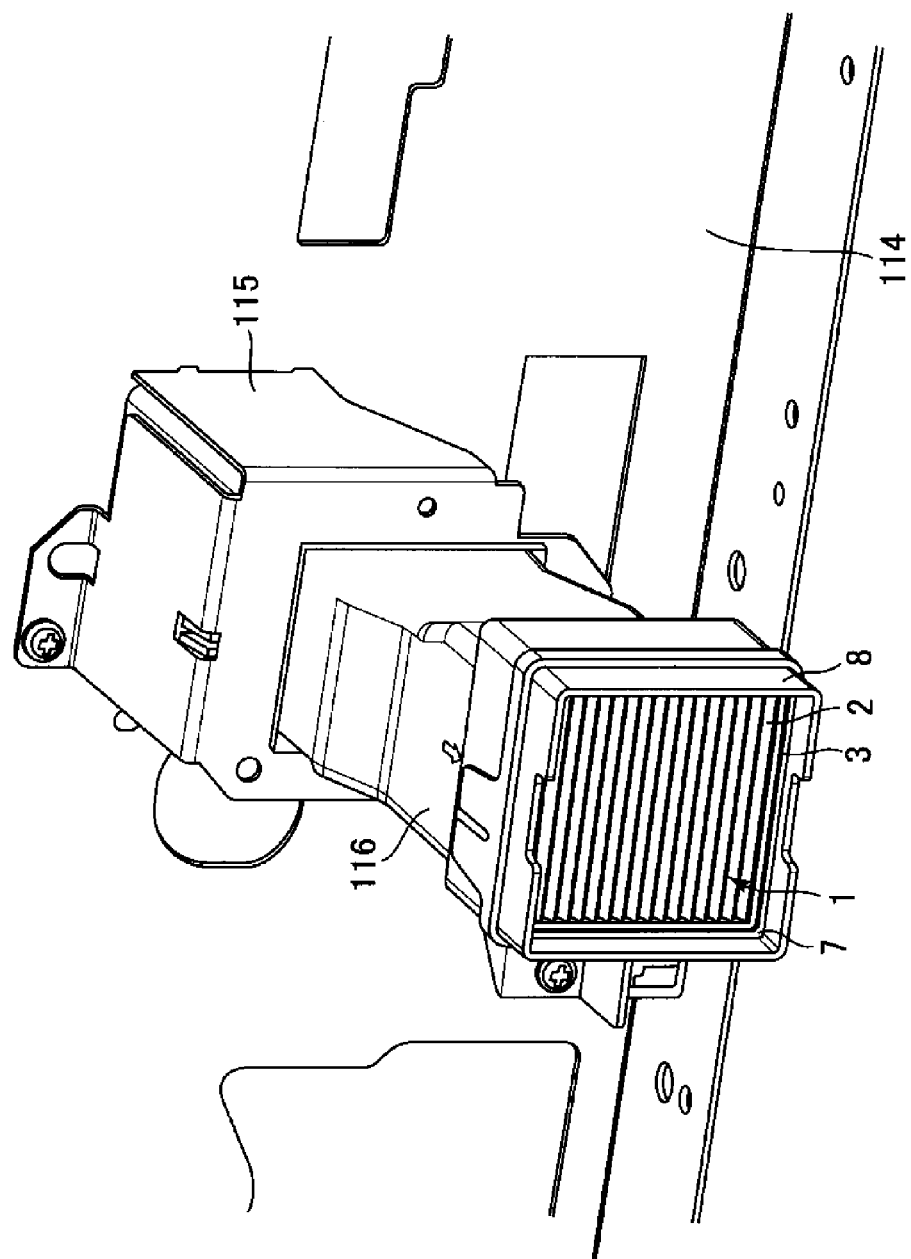
FIG. 11 is a perspective view of a principal part of the image forming apparatus for illustrating a mounting procedure of the filter assembly into the image forming apparatus in the Embodiment and for illustrating an exchanging (replacing) procedure of the filter assembly in the Embodiment.

Thereafter, as shown in FIG. 11, to the exhaust duct 116, the unit prepared by integrally assembling the filter frame 3 holding the filter 2 with the gap-filling member 7 and the filter case 8 is mounted via the filter case 8. The exhaust duct 116 is mounted on a side plate 114 of the apparatus main assembly 110 via a duct supporting plate 115. In this way, the filter case 8 in which the gap-filling member 7 is disposed at the outer peripheral surface of the dust collecting filter 1 is disposed at an exhaust pass surface of the exhaust duct 116.

Then, when the dust collecting filter 1 contaminated by dust collection in use is exchanged (replaced), the following operation is performed. That is, in a manner, reverse to that during the above-described mounting of the dust collecting filter 1, the filter case 8 is demounted from the exhaust duct 116, and thereafter, the filter frame 3 which is mounted at the inner peripheral portion of the filter case 8 and which holds the contaminated filter 2 is demounted together with the gap-filling member 7 from the filter case 8. Then, the elastic engaging claws 54, made of the plastic in this embodiment, of the filter frame 3 are elastically deformed by using a tip of a screw driver, tweezers or fingers and then are disengaged from the engaging grooves 45. Then, by a procedure reverse to the above-described assembling procedure, the first and second frame portions 4 and 5 are rotated relative to each other to be opened, and thereafter the contaminated filter 2 is taken out (FIG. 8). Then, in a similar manner to that described above, e.g., a new (fresh) filter 2 for exchange is held by the filter frame 3, so that the dust collecting filter 1 is completed. This dust collecting filter 1 is mounted to the exhaust duct 116 similarly as described above.

Here, in this embodiment, as described above, the hinge portion 6 of the filter frame 3 is provided, at the upper portion of the outer side wall 51a of the second frame portion 5, inside the outer side wall 51a with respect to the thickness direction. As a result, the hinge portion 6 does not protrude from the outer peripheral side 51a2 of the second frame portion 5. Accordingly, the hinge portion 6 does not interfere with the gap-filling member 7 when the filter 2 is mounted and exchanged. As a result, it is possible to omit a cumbersome operation such that the gap-filling member 7 is demounted and then mounted again when the operation of mounting and exchanging the filter 2 is performed.

Further, in this embodiment, the hinge portion 6 is disposed so that the fold direction of the pleated filter and the rotational direction of the first and second frame portions 4 and 5 coincide with each other. That is, in this embodiment, the hinge portion 6 is provided so that a rotational axis direction of each of the first and second frame portions 4 and 5 is substantially perpendicular to the fold direction X of the pleating. As a result, the first and second holding portions 43 and 53 provided to the first and second frame portions 4 and 5, respectively, do not interfere with each other from start of rotation of the first and second frame portions 4 and 5 until the engaging claws 54 are engaged with the engaging grooves 45 to complete the dust collecting filter 1. For that reason, the filter 2 can be mounted more simply.

As described above, according to this embodiment, the filter frame 3 holds the filter 2 with high reliability, so that it becomes possible to improve operativity such as a mounting property, an exchanging property and the like of the filter 2 while ensuring a dust collecting function of the filter 2. That is, according to this embodiment, the pleated filter 2 can be held at the predetermined position of the filter frame 3 with high reliability, and at the same time, it is possible to improve the operativity such as the mount property, the exchanging property and the like of the filter 2.

Further, according to this embodiment, the filter frame 3 holds the filter 2 by sandwiching the filter 2 between the first and second holding portions 43 and d53 engageable with the filter 2 in a complementary manner. For that reason, in order to hold the filter medium 2, there is no need to particularly increase a size of the filter medium 2. That is, different from the filter assembly of JP-A (Tokuhyo) Hei 11-511380, there is no increase in area of the filter in a developed state by an amount corresponding to the pleated ridges held in the gap for holding the pleated ridges, and therefore there is no increase in the number of materials necessary for the filter correspondingly to the increased amount of the area. Further, in this embodiment, by the constitution described above, it becomes possible to suppress the disconnection of the filter 2 from the filter frame 3 with high reliability.

Further, according to this embodiment, the first frame portion 4 was provided with the positioning portions 44 for positioning the filter 2. As a result, it becomes possible to suppress lowering in dust collecting function of the filter 2 and in operativity, such as the mounting and exchanging properties of the filter 2, caused by a phenomenon such that it becomes difficult to position and mount the filter 2 due to variation in size of the filter 2.

As described above, the present invention was described based on a specific embodiment (Embodiment 1), but is not limited to Embodiment 1.

For example, in Embodiment 1 described above, the first and second frame portions 4 and 5 of the filter frame are rotatably connected with each other by the hinge portion. As a result, when the filter is mounted and exchanged, there is no need to align the directions of the first and second frame portions with each other, so that the operativity is very good. However, the present invention is not limited to this embodiment, but the first and second frame portions of the filter frame may also be separable from each other. In this case, the substantially same constitution as in Embodiment 1 except that the first and second frame portions are not connected with each other by the hinge portion can be employed.

Further, the lock means for maintaining the state in which the filter is held by the first and second frame portions is not limited to the engagement between the projected portion and the recessed portion, but may preferably employ any constitution if the constitution can fix the first and second frame portions in a fixation-removable manner. For example, the lock means may also be a fastening member, a peelable adhesive tape and the like.

Further, as in Embodiment 1, it is preferable, from the viewpoint that the filter can be held more stably, that the first and second frame portions holds the substantially entire periphery (the both end portions the filter with respect to the fold direction and the terminal portions of the filter with respect to the direction substantially perpendicular to the fold direction in Embodiment 1). However, as desired, a constitution in which either of the end portions or the terminal portions of the filter (e.g., either one or both of the end portions with respect to the fold direction or either one or both of the terminal portions with respect to the direction substantially perpendicular to the fold direction in Embodiment 1) may also be employed. However, in order to hold the filter more stably, the filter may preferably be held in both sides with respect to at least one of the fold direction of the filter and the direction substantially perpendicular to the fold direction.

Further, as in Embodiment 1, the positioning portions may preferably be provided on all the outer side walls of the first frame portion from the viewpoint of the positioning of the filter at the predetermined position with high reliability. However, as desired, a constitution in which the positioning portions are not provided on either of the outer side walls (e.g., either one or both of the two fold end portion outer side walls r either one or both of the two fold direction outer side walls) may also be employed. However, in order to determine the position of the filter with high reliability, the positioning portions may preferably be provided on the outer side walls in sides corresponding to the both end portion sides with respect to at least one of the fold direction of the filter and the direction substantially perpendicular to the fold direction.

Further, in Embodiment 1, with respect to the filter, the substantially equal fold width and pitch are used in the pleating, but either one or both of the width and the pitch may also be positively changed. Also in this case, similarly as in Embodiment 1, the first and second holding portions may only be required to be formed correspondingly to the shapes of the ridges and troughs of the filter.

Further, in Embodiment 1, the filter assembly was described as a filter exchangeable (replaceable) assembly. According to the present invention, the filter mounting and exchange become easy, and therefore the present invention is preferably applicable to the case where the filter is exchangeable, but is not limited to the case. Even in the case where the filter is substantially incorporated in the filter assembly on the filter mounting process during the manufacturing, according to the present invention, the manufacturing of the filter assembly becomes easy. As a result, it is possible to obtain an effect, corresponding to the effect of Embodiment 1, such that it is possible to suppress an inconvenience due to the deviation or the like of the filter.

Further, in Embodiment 1, the filter was described as the filter having the dust collecting characteristic, but the function of the filter is not limited to the dust collecting function. When the filter assembly using the filter subjected to the pleating is used, a similar effect to the effect of Embodiment 1 can be obtained by similarly applying the direction. For example, as the filter, it is possible to use a filter having a deodorant characteristic in addition to or in place of the dust collecting characteristic. Further, fluid passing through the filter is not limited to gas but may also be liquid.

Further, in Embodiment 1, the filter assembly was described as the filter assembly used in the image forming apparatus, but the present invention is not limited to the filter assembly. For example, the present invention is also applicable to filter assemblies used in any equipment, such as a device provided with an exhaust duct required to be provided with the dust collecting filter similarly as in Embodiment 1.

According to the present invention, the pleated filter can be held at the predetermined position of the filter frame with high reliability, and at the same time, it is possible to improve the operativity such as the mount property, the exchanging property and the like of the filter.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 145672/2013 filed Jul. 11, 2013, which is hereby incorporated by reference.

What is claimed is:

1. A filter frame for holding a filter, the filter frame comprising:
 a first frame portion including a first holding portion, having a first side portion corresponding to a first side of the filter, for holding the filter, a first plurality of ridges and troughs being formed on the first side portion;
 a second frame portion including a second holding portion, having a second side portion corresponding to a second side of the filter that is a back surface of the first side of the filter, for holding the filter by sandwiching the filter between the first and second holding portions so as to oppose the first holding portion via the filter, a second plurality of ridges and troughs being formed on the second side portion complementarily to the first plurality of ridges and troughs formed on the first side portion; and
 a hinge portion, rotatably connecting the first frame portion and the second frame portion.

2. A filter frame according to claim 1, further comprising:
 a plurality of latching portions, provided in the first frame portion, configured to cause the first frame portion and the second frame portion to be latched; and
 a plurality of latched portions, provided in the second frame portion, configured to be latched by the latching portions,
 wherein the latching portions include a first latching portion provided in a first side of the first frame portion that adjoins the side in which the hinge portion is provided and a second latching portion provided in a second side of the first frame portion that opposes the first side and adjoins the side in which the hinge portion is provided, and a third latching portion provided in a third side of the first frame portion opposing the side in which the hinge portion is provided.

3. A filter frame according to claim 2, wherein the latching portions and the latched portions are provided in all the sides of the frame other than the side in which the hinge portion is provided.

4. A filter according to claim 1, further comprising:
 a first engaging portion, provided on at least one sidewall of the first frame portion other than a sidewall where the hinge portion is provided, and configured to engage the first frame portion with the second frame portion; and a second engaging portion, provided on at least one sidewall of the second frame portion other than a sidewall where the hinge portion is provided, and configured to engage the first engaging portion, wherein the first engaging portion is an elastically deformable engaging claw and the second engaging portion is an engaging groove engageable with the engaging claw, and wherein the engaging claw includes a tapered portion narrowing toward an upstream side with respect to a direction in which the second frame portion enters the first frame portion when the second frame portion and the first frame portion are engaged with each other.

5. A filter frame according to claim 1, wherein the hinge portion is provided so as to be prevented from projecting from an outer peripheral surface of the filter frame holding the filter.

6. A filter frame according to claim 1, wherein the hinge portion is provided so that a rotational axis direction of the first and second frame portions is substantially perpendicular to a fold direction of the filter.

7. A filter frame according to claim 1, further comprising a positioning portion, provided on at least one of the plurality of ridges on the first holding portion, for determining a position of the filter, the positioning portion being provided so as to project from at least one of the plurality of ridges formed on the first holding portion toward the filter.

8. A filter frame according to claim 1, further comprising a positioning portion that penetrates through the filter disposed on the first holding portion.

9. A filter frame according to claim 1, further comprising a positioning portion including a locking portion for locking the filter disposed on the first holding portion.

* * * * *